June 20, 1950  M. ROBINEAU  2,511,996
ELECTRIC COMPARING MECHANISM
Filed Feb. 7, 1947  3 Sheets-Sheet 1

INVENTOR,
Marcel Robineau.
BY
Edward R. Lowndes
ATTORNEY

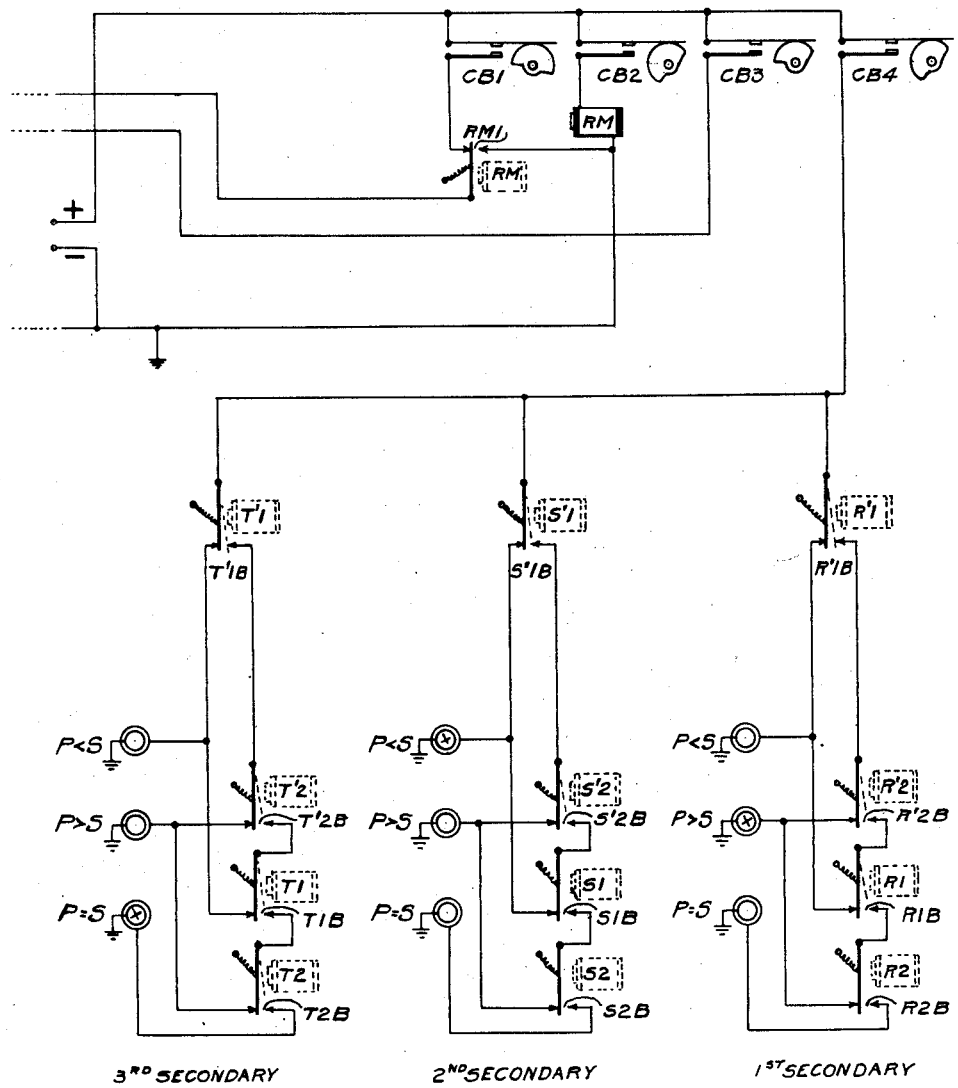

June 20, 1950 M. ROBINEAU 2,511,996
ELECTRIC COMPARING MECHANISM
Filed Feb. 7, 1947 3 Sheets-Sheet 3

INVENTOR,
Marcel Robineau.
BY
Edward R. Sounder
ATTORNEY

Patented June 20, 1950

2,511,996

UNITED STATES PATENT OFFICE 2,511,996

ELECTRIC COMPARING MECHANISM

Marcel Robineau, Paris, France, assignor to International Business Machines Corporation, New York, N. Y., a corporation of New York Application February 7, 1947, Serial No. 727,016
In France July 18, 1944

Section 1, Public Law 690, August 8, 1946
Patent expires July 18, 1964

5 Claims. (Cl. 235—61.7)

The improved electric comparing mechanism comprising the present invention is primarily adapted for use in connection with record controlled accounting machines of the type in which the controlling records are in the form of perforated cards. The present comparing mechanism constitutes an analyzing device capable of comparing numbers or amounts represented by perforations in two or more tabulating cards. The invention is not necessarily confined to use in connection with accounting machines of this type and the same may, with or without modification, be employed for comparing numbers or amounts, regardless of the origin of the latter. When employed in connection with accounting machines of the type set forth above, use is made of the conventional readout devices commonly employed in connection with such machines to permit a comparison of accumulated totals in one totalizer with data from another or several other totalizers in the same tabulating or calculating machine. Such a comparison is for the purpose of determining whether the total accumulated in the first or primary totalizer is higher than, equal to or lower than the total of one, or the totals or another or several other secondary totalizers.

A device of this type has numerous applications, principal among which is its use in connection with calculating machines that are capable of effecting division operations wherein it is required to make a comparison between a dividend, and a divisor, as for example is the case in connection with French Patent No. 829,233, dated July 8th, 1937. A machine of this type may also be employed in connection with tabulating machines which are intended for performing bank balance operations, wherein the equality of accumulated amounts require checking. The apparatus also finds application in connection with public utility accounting, particularly where the vending and distribution of electricity, gas or water is concerned. In such an instance, it may be necessary to determine consumption quantities in kilowatt hours, cubic feet or gallons and to verify whether the consumptions allocated have or have not been exceeded. Examples such as those given above are, of course, merely illustrations and the scope of the invention is not to be limited thereby.

In the accompanying sheets of drawings forming a part of this specification, two circuit diagrams representing two methods of carrying out the invention have been shown. In the first circuit diagram, means are illustrated wherein a primary number or quantity may be compared with a secondary number or quantity, whereas in the second circuit diagram means are illustrated wherein it is possible to compare a primary number with several secondary numbers.

In the drawings:

Figs. 2 and 2a are circuit diagrams representing another form of the invention.

Figure 1:
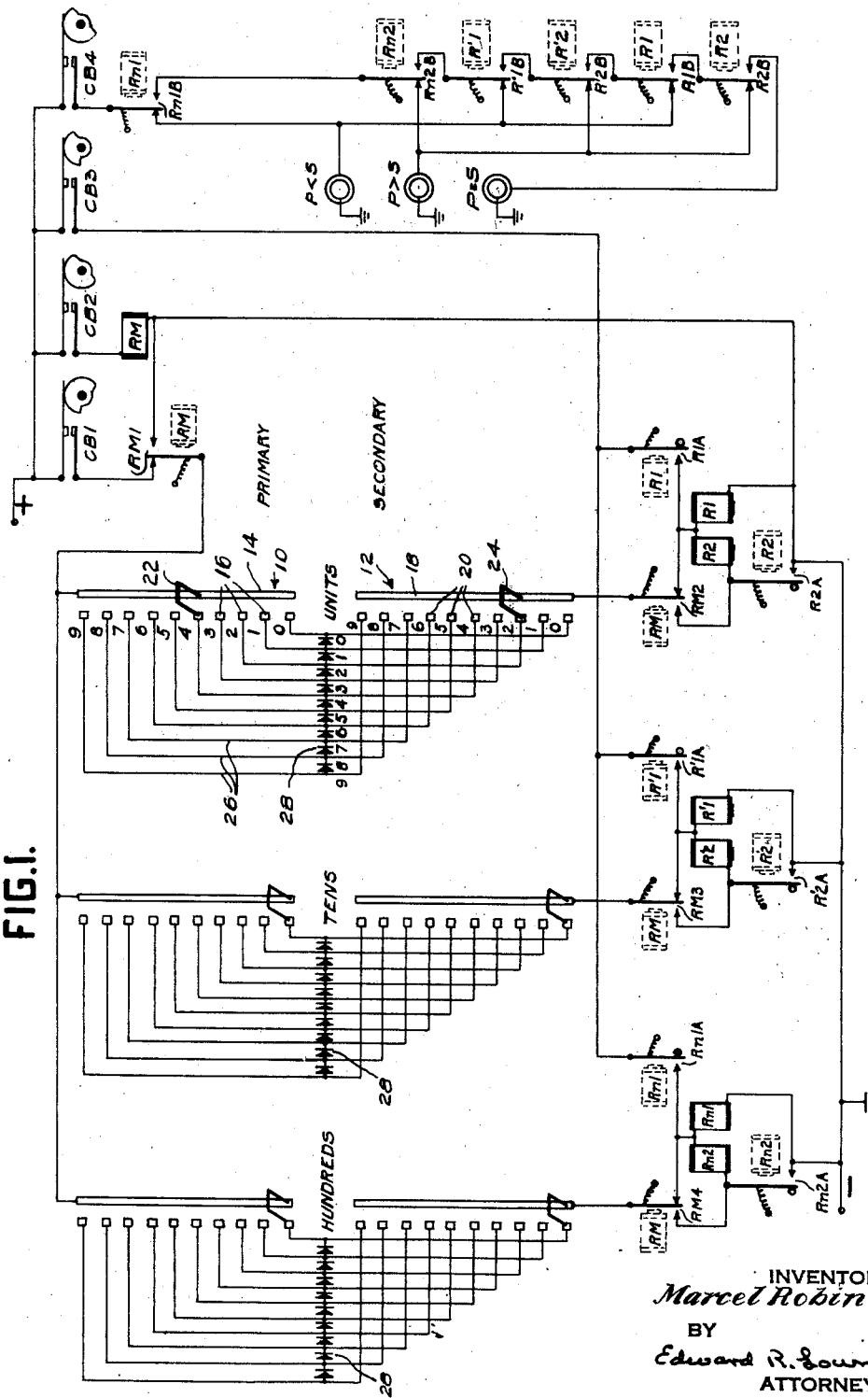
Fig. 1 is a circuit diagram representing one form of the invention.

The circuit diagram of Fig. 1 represents one form of the invention wherein a multi-digit primary number is compared with a single multi-digit secondary number. When the device is used in connection with a tabulating machine the primary number is accumulated or otherwise set into a series of readout devices and the secondary number is accumulated and set into a similar series of such devices, each series including a device for each digital order of the number. In the present instance, the apparatus has been illustrated in connection with comparison of two numbers, each possessing three digital orders, namely, units, tens and hundreds orders. However, for purposes of simplification, only that portion of the apparatus associated with the units order of the numbers undergoing comparison has been set up to perform an actual digit comparison. For the two other orders of the number, the apparatus by means of which comparisons may be made is portrayed in the drawings but has not been set up for comparison of any specific digits. To further the simplification of the disclosure, it will be assumed that a condition of equality exists throughout these higher orders.

In the medial regions of Fig. 1 a pair of readout devices are diagrammatically illustrated, the upper readout device being designated in its entirety at 10 and the lower readout device being similarly designated at 12. Each of these devices may operate under the control of one of a series of total accumulating devices associated with a pair of totalizers in an accounting machine. For example, they may be controlled by the dividend and divisor accumulators respectively associated with a calculating machine. Alternatively, they may constitute integral totalizing elements of the machine itself. Irrespective, however, of the source of actuation of the two readout devices 10 and 12, the essential features of the invention are not disturbed.

The readout devices 10 and 12, according to the present illustrative disclosure, represent respectively the units orders of a multi-digit primary and secondary number having three digital orders, the relation between which numbers is to be compared for a high condition, an equal condition or a low condition. The readout device 10 is provided with a common segment 14 and a series of contact elements or studs 16, while the readout device 12 is similarly provided with a common segment 18 and contact elements 20. The contact elements of each device are ten in number, each corresponding to a digit in the Arabic system and each series is labeled from 0 to 9 inclusive. The readout device 10 will hereinafter be referred to as the primary readout device, as it is designed to have set up therein the digit of the units order of the primary number which is to be compared with the corresponding digit of the units order of the secondary number. This latter digit is adapted to be set up in the readout device 12 and, as a consequence, this latter device will hereinafter be referred to as the secondary readout device. As illustrated in the drawings, the primary readout device 10 is set up with the number "4" and, toward this end, the contact element 16 labeled 4 is electrically connected by a shoe or brush 22 to the common segment 14. In a similar manner, the secondary readout device is set up with the digit "2" and, accordingly, the contact element labeled 2 is electrically connected by a shoe brush 24 to the common segment 18.

The contact elements of the readout device 12 are electrically connected to corresponding elements of the readout device 10 by means of a series of wires 26 labeled 0 to 9 inclusive. Each of the wires 26 is connected to the next adjacent wire by a suitable uni-directional device 28, as for example, a copper oxide or other oxymetal element, vacuum tube or other rectifier device possessing the property of permitting flow of current in one direction only. These rectifier devices 28 are so situated as to permit current to flow from any one wire of the series 26 to the wire which represents the next lower digit in the order of the multi-digit number which is undergoing comparison. Current entering the readout device 10 at the common segment 14 and passing to any one of the contact elements 16 will find its way to the common segment 18 of the readout device 12 only if the secondary digit undergoing comparison is equal to or lower than the primary digit.

Figure 3:
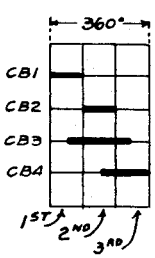
Fig. 3 is a time or machine cycle chart for the present apparatus.

Proceeding with the comparison of the digit 4 with the comparatively lower digit 2 in the units order of the multi-digit primary and secondary numbers undergoing comparison, an electrical impulse is sent to the primary readout device 10 by closure of a pair of cam controlled contacts CB1 at the commencement of the machine cycle (see Fig. 3). This current is of a selected polarity and issues from the positive side of the source and passes through contacts CB1, contact RM1 (normal), common segment 14 of the primary readout device 10, brush 22, No. 4 contact element 16, corresponding No. 4 wire, Nos. 4 and 3 rectifier devices 28, No. 2 wire, No. 2 contact element 20 of the secondary readout device 12, brush 24, common segment 18, contact RM2 normal, relay magnet R1 to the negative side of the line. Upon energization of the magnet R1 in the manner just described, a pair of contacts R1A become closed, thus establishing a holding circuit through the magnet R1 by virtue of the closure of a pair of cam controlled contacts CB3 at or near point 2 of the machine cycle (see Fig. 3). Energization of the magnet R1 is an indication that the primary digit is higher than or at least equal to the secondary digit and, conversely, lack of energization of the relay R1 is an indication that the primary digit is lower than the secondary digit.

To effect a further discrimination to determine whether the primary digit is actually higher than the secondary digit, or whether it is equal to the latter, means are provided for applying a potential of reverse polarity to the primary readout device 10. Toward this end, a pair of cam controlled contacts CB2 become closed at or near point 2 in the machine cycle, thus energizing relay magnet RM and consequently reversing or transferring the contacts RM1. A circuit will then be partially established from the negative side of the line through the transferred contacts RM1 to the common segment 14 of the primary readout device, thence through the brush 22, No. 4 contact element 16 and the No. 4 wire 26 from which it continues through the rectifier devices 28 to the 5 to 9 segments 20 as well as to the 4 segment 20. If brush 24 is set at a lesser value than 4, the circuit is discontinuous at the segments 20. If brush 24 were set at 4, the circuit would continue through the brush to segment 18, transferred pair of contacts RM2, relay magnet R2, contacts R1A previously closed, previously closed contacts CB3 to the positive side of the line. The circuit just described operates, of course, only if relay magnet R1 has become energized by the first impulse and in such an instance energization of magnet R2 will indicate that the primary digit is equal to the secondary digit.

For each of the other orders of the primary and secondary numbers undergoing consideration, similar and parallel circuits may be found and the possible energization or non-energization of corresponding relay magnets R'1, R'2, Rn1 and Rn2 is obtained. These latter relay magnets in the tens and hundreds orders of the primary and secondary digits fulfill the same functions in connection with the actuation of contacts R'1A, R'2A, Rn1A and Rn2A as the function of the relay magnets R1 and R2.

Referring now to the right-hand side of Fig. 1, three output circuits, whose terminals are represented as P<S (primary smaller than secondary); P>S (primary greater than secondary); and P=S (primary equals secondary) are labeled accordingly. These output circuits may be used in any suitable manner in a control circuit, an indicating circuit including lamps, etc., being employed to indicate the low, high or equal state existing between the numbers undergoing comparison.

A series of contacts associated with the three output circuits just mentioned operate under the control of the relay magnets R1, R2; R'1, R'2; and Rn1, Rn2. These contacts respectively are designated at R1B, R2B; R'1B, R'2B; and Rn1B and Rn2B. All of these contacts are of the transfer type and are capable of performing their functions when a pair of cam controlled contacts CB4 become closed at or near the third cycle point.

In the event that the primary digit is less than the secondary digit, upon closure of the pair of cam controlled contacts CB4 current will flow from the positive side of the line through contacts CB4, contacts Rn1B (now transferred because of a condition of equality), Rn2B (also transferred), R'1B (transferred), R'2B (transferred), R1B (normal), to the output circuit P<S. It is obvious that if the inequality occurs in the tens or hundreds orders of the digits, non-transferrence of selected preceding contacts Rn1B, Rn2B, R'1B or R'2B will permit current to find its way to the output circuit P<S by a shorter route.

If the primary digit undergoing comparison is greater than the secondary digit in the units order of the numbers undergoing comparison, current issuing from the contacts CB4 will pass through contacts Rn1B (transferred), Rn2B (transferred), R'1B (transferred), R'2B (transferred), R1B (transferred), R2B (normal) to the output circuit P>S.

If the primary number is equal to the secondary number in all orders thereof, current issuing from the contacts CB4 will pass through all of the sets of contacts inasmuch as all of them will have been transferred and the circuit may then be traced through contacts Rn1B, Rn2B, R'1B, R'2B, R1B and R2B to the output circuit P=S.

Figure 2:
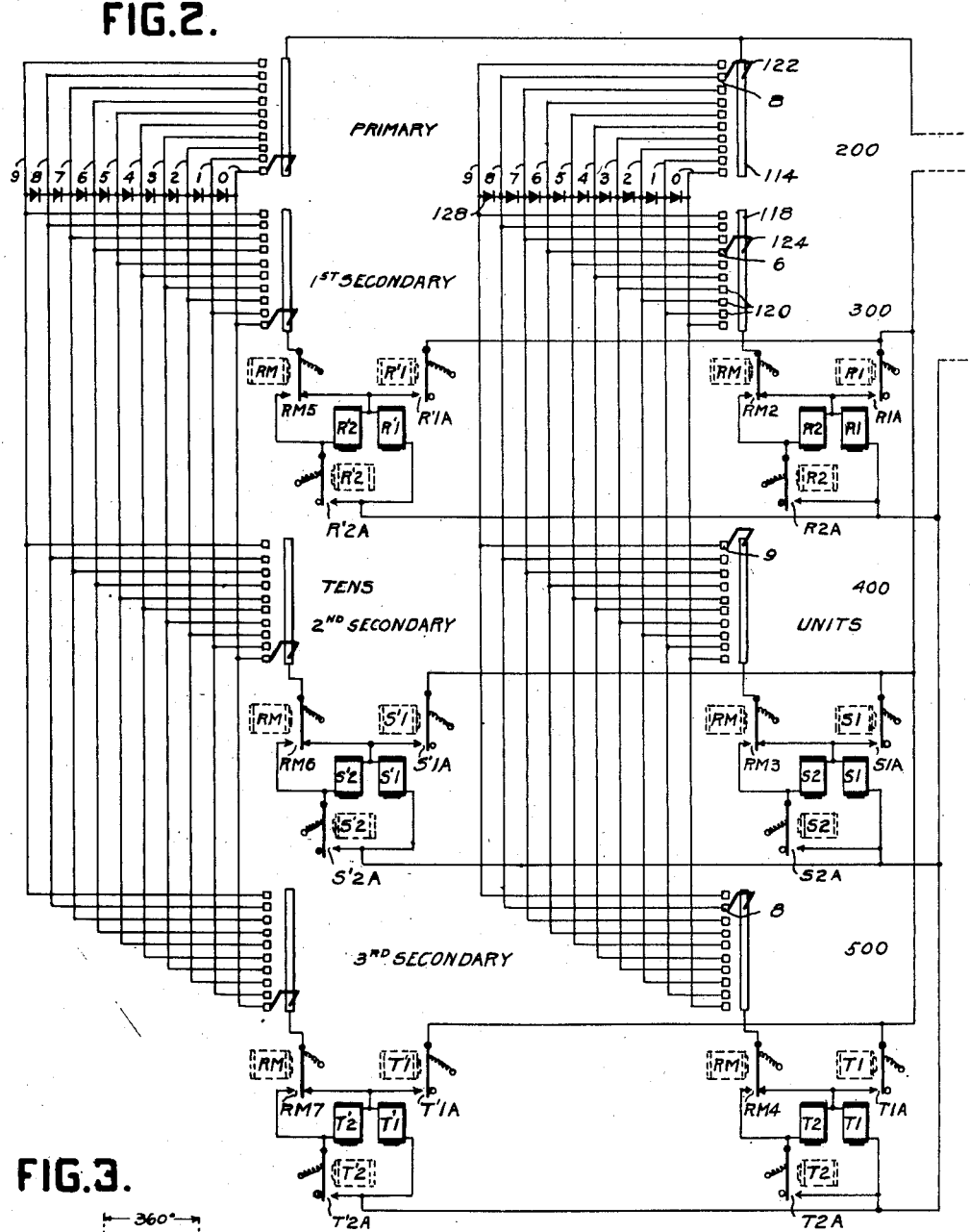

In Figs. 2 and 2a a modified form of the invention is disclosed and by means of the mechanism shown therein the apparatus will accommodate simultaneous comparison of a primary number with several secondary numbers. In this form of the invention, the same principles are involved as in the form of the invention shown in Fig. 1 and the same manner of disclosure is resorted to in the drawings. The primary readout device is designated at 200 while a first, second and a third secondary readout device carries reference numerals 300, 400 and 500 respectively. Whereas in the previous form of the invention the apparatus was illustrated in connection with mechanism whereby multi-digit numbers having three orders, namely, units, tens and hundreds, was disclosed, in the present instance, for the sake of simplicity, the apparatus is shown as being designed for the comparison of numbers having but two digits or orders, namely, units and tens. It will be understood that for multi-digit numbers having a greater number of orders mere duplication of parts may be resorted to. As in the case of the previous form of the invention, only that section of the apparatus which is concerned with the units order of the numbers undergoing comparison is shown as being set up for digit comparing. The digits selected for comparison in the present instance are the digits 8, which is the unit digit of the primary number and which is set into the primary reading device, and the digits 6, 9 and 8 which have been set into the secondary readout devices. Thus, a low condition exists in the comparison of the primary number with the first secondary number, a high condition exists where the second secondary number is concerned, and an equal condition exists in connection with the third secondary number. In the output regions of the device each secondary set of units is provided with a set of output circuits labeled P<S, P>S and P=S. The relay magnets R1 and R2 correspond to the similarly designated magnets in the other form of the invention, while the relay magnets S1 and S2, and T1 and T2 are their equivalents in the two added secondary circuits. The same system of designation for the various contacts which operate under the control of the relay magnets S1, S2 and T1, T2 still obtains and it is thought that a detailed description of the various relay circuits may be dispensed with. Similarly, where the tens order of the four numbers undergoing comparison is concerned, the relay magnets R'1, R'2; S'1, S'2; and T'1, T'2 correspond to the similarly arranged and similarly designated magnets in the tens order group of instrumentalities associated with the previous form of the invention.

Proceeding now to the comparison of the digit 8 with the digits 6, 9 and 8 simultaneously, the circuit for the comparison of the primary number with the first secondary number leads from the positive side of the source through cam controlled contacts CB1, normally closed contacts RM1, common segment 114 of the primary readout device 200, brush 122, 8 wire, rectifier units 128 to the 6 wire, and from thence to the No. 6 contact element 120, common segment 118, normally closed contacts RM2, relay magnet R1 to the negative side of the line. Energization of the magnet R1 indicates that the primary digit is higher or equal to the secondary digit. To determine whether a high or an equal condition exists in the comparison, the contacts CB2 close, thus energizing the magnet RM and connecting the primary readout device to the negative side of line through a circuit which may be partially traced from the negative side of the line through contacts RM1 (reversed), contact segment 114, brush 122, connecting wire No. 8 from whence no current path is provided inasmuch as the brush 124 is in engagement with the No. 6 contact element of the first secondary readout device. Thus, current does not find its way to the positive side of the line and the relay magnet R2 does not become energized. As a consequence, in the output stage of the device, when the contacts CB4 are closed current will pass from the positive side of the line through the contacts CB4, contacts R'n1B (transferred because of the assumed equal condition in the high digital orders of the number), R'n2B (transferred for the same reason), R1B (transferred), R2B (normal) to the output circuit P>S.

Simultaneously with the comparison of the primary number with the first secondary number, a comparison is made with the second secondary number and to effect this comparison current flows from the positive side of the line through the primary readout device, in the manner previously described, through the No. 8 wire leading to the second secondary readout device 400. Since current is unable to proceed from the No. 8 wire to the No. 9 wire in the primary readout device 200, it will find no path to the negative side of the line, and, as a consequence, the relay magnet S1 will not become energized. This is an indication that the primary number is lower than the secondary number and, as a consequence, when the contacts CB4 become closed current will pass from these contacts through the contacts S'n1B (transferred), S'n2B (transferred), and S1B (normal) to the P<S output circuit.

Also simultaneously with the comparisons above described, the primary number is compared with the third secondary number and an equal condition is found to exist. In this instance, after the initial comparison processes are carried out, as previously described, when current of a reverse polarity is applied to the primary readout device, by virtue of the closure of the contacts CB2 and energization of the magnet RM, it will find its way directly through the No. 8 wire leading from the No. 8 contact element in the primary device to the No. 8 contact element in the secondary readout device and from thence it will flow through contacts RM4 (transferred), relay magnet T2, contacts T1A (previously closed) and contacts CB3 to the positive side of the source. Because of the energization of the relay magnet T2, contacts T2B in the output regions of the device will become transferred, thus leading current from its previously prepared path to the output circuit P=S.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. Apparatus for comparing the relative magnitude of a primary digit with the magnitude of a secondary digit to determine whether a low, an equal or a high condition exists in the comparison, said apparatus comprising a primary readout device and a secondary readout device, each of said devices including a common segment and a series of contact elements each of which corresponds to a respective digit, a conductor electrically connecting each contact element of each device with its corresponding contact element in the other device, the series of contact elements and conductors representing digits from 0 to 9 inclusive, a brush for each readout device for selectively connecting the contact elements thereof with the common segment, said brushes being adapted to be positioned in accordance with the primary and secondary digits to be compared, a uni-directional device connecting each conductor of a higher magnitude with a conductor of the next lower magnitude in the series whereby current may flow from one conductor to the next conductor in downward progression throughout the series, means for successively applying potentials of opposite polarity to the common contact segment of the primary readout device, an operating circuit leading from the common segment of the secondary readout device, current responsive means disposed in said operating circuit, and means controlled thereby for indicating the condition of energization or deenergization of said current responsive means.

2. Apparatus for comparing the relative magnitude of a primary digit with the magnitude of a secondary digit to determine whether a low, an equal or a high condition exists in the comparison, said apparatus comprising a primary readout device and a secondary readout device, each of said devices including a common segment and a series of contact elements each of which corresponds to a respective digit, a conductor electrically connecting each contact element of each device with its corresponding contact element in the other device, the series of contact elements and conductors representing digits from 0 to 9 inclusive, a brush for each readout device for selectively connecting the contact elements thereof with the common segment, said brushes being adapted to be positioned in accordance with the primary and secondary digits to be compared, a uni-directional device connecting each conductor of a higher magnitude with a conductor of the next lower magnitude in the series whereby current may flow from one conductor to the next conductor in downward progression throughout the series, means for successively applying potentials of opposite polarity to the common contact segment of the primary readout device, a normally open operating circuit leading from the common segment of the secondary readout device, an output circuit representing a low condition between the digits undergoing comparison, means under the control of said operating circuit and effective when the latter is open for energizing said first mentioned output circuit upon application of one of the potentials to the common contact segment of the primary readout device, a magnet disposed in said operating circuit, and means controlled thereby to indicate the condition of energization or deenergization of said magnet.

3. Apparatus for comparing the relative magnitude of a primary digit with the magnitude of a plurality of secondary digits to determine whether a low, an equal or a high condition exists in the comparison comprising a primary readout device and a plurality of secondary readout devices, each of said devices including a common segment and a series of contact elements each of which corresponds to a respective digit, conductors electrically connecting each contact element of each device with its corresponding contact element in each of the other devices, a brush for each readout device for selectively connecting the contact elements thereof with the common segment, said brushes adapted to be positioned in accordance with the primary and secondary digits to be compared, a uni-directional device connecting each conductor of a higher magnitude with a conductor of the next lower magnitude in the series, whereby current may flow from one conductor to the next conductor in downward progression throughout the series, means for successively applying potentials of opposite polarity to the common contact segment of the primary readout device, an operating circuit leading from the common segments of each secondary readout device, an indicator, a magnet disposed in each of said operating circuits, and means controlled thereby for controlling the operation of said indicator in accordance with the energization or deenergization of said magnet.

4. Apparatus for comparing the relative magnitude of a primary digit with the magnitude of a secondary digit to determine whether a low, an equal or a high condition exists in the comparison, said apparatus comprising a primary readout device and a secondary readout device, each of said devices including a common segment and a series of contact elements each of which corresponds to a respective digit, a conductor electrically connecting each contact element of each device with its corresponding contact element in the other device, the series of contact elements and conductors representing digits from 0 to 9 inclusive, a brush for each readout device for selectively connecting the contact elements thereof with the common segment, said brushes being adapted to be positioned in accordance with the primary and secondary digits to be compared, a uni-directional device connecting each conductor of a higher magnitude with a conductor of the next lower magnitude in the series whereby current may flow from one conductor to the next conductor in downward progression throughout the series, means for successively applying potentials of opposite polarity to the common contact segment of the primary readout device, an operating circuit leading from the common segment of the secondary readout device, a series of relay devices disposed in said operating circuit, a labyrinth circuit, a plurality of indicating circuits common to said labyrinth circuit, means operable under the control of said relay devices for energizing said labyrinth circuit to in turn selectively energize said indicating circuits, and means disposed in said indicating circuits for indicating the condition of energization or de-energization of the latter.

5. Apparatus for comparing the relative magnitude of a primary digit with the magnitude of a secondary digit to determine whether a low, an equal or a high condition exists in the comparison, said apparatus comprising a primary readout device and a secondary readout device, each of said devices including a common segment and a series of contact elements each of which corresponds to a respective digit, a conductor electrically connecting each contact element of each device with its corresponding contact element in the other device, the series of contact elements and conductors representing digits from 0 to 9 inclusive, a brush for each readout device for selectively connecting the contact elements thereof with the common segment, said brushes being adapted to be positioned in accordance with the primary and secondary digits to be compared, a uni-directional device connecting each conductor of a higher magnitude with a conductor of the next lower magnitude in the series whereby current may flow from one conductor to the next conductor in downward progression throughout the series, means for successively applying potentials of opposite polarity to the common contact segment of the primary readout device, an operating circuit leading from the common segment of the secondary readout device, a plurality of signal circuits, one representing a low condition, another representing a high condition and a third representing an equal condition between the digits undergoing comparison, a series of relay devices disposed in said operating circuit, and means operable upon actuation of said relay devices for selectively completing said signal circuits.

MARCEL ROBINEAU.

No references cited.